(12) United States Patent  (10) Patent No.: US 6,621,189 B1
Flynn                     (45) Date of Patent: Sep. 16, 2003

(54) SWITCHED RELUCTANCE MOTOR HAVING WINDINGS SEPARATED BY A RADIAL LINE AND METHOD OF MANUFACTURE

(75) Inventor: Kenneth L. Flynn, Paragould, AR (US)

(73) Assignee: Emerson Electric Co., St. Louis, MO (US)

( * ) Notice: Subject to any disclaimer, the term of this patent is extended or adjusted under 35 U.S.C. 154(b) by 33 days.

(21) Appl. No.: 09/602,913

(22) Filed: Jun. 23, 2000

(51) Int. Cl.$^7$ ............................................... H02K 17/00
(52) U.S. Cl. ....................... 310/166; 310/208; 310/68 B
(58) Field of Search ............................... 310/166, 68 B, 310/179, 208, 187, 216; 318/701, 801, 254

(56) References Cited

U.S. PATENT DOCUMENTS

| 5,051,669 A | * | 9/1991 | Hsiao et al. ................. 318/119 |
| 5,457,375 A | | 10/1995 | Marcinkiewicz et al. ... 318/802 |
| 5,467,025 A | | 11/1995 | Ray ............................. 324/772 |
| 5,701,064 A | | 12/1997 | Horst et al. .................. 318/701 |
| 5,773,908 A | * | 6/1998 | Stephens et al. ............. 310/254 |
| 5,793,179 A | | 8/1998 | Watkins ....................... 318/701 |
| 5,825,113 A | * | 10/1998 | Lipo et al. .................... 310/181 |
| 5,929,590 A | | 7/1999 | Tang ............................ 318/701 |

* cited by examiner

Primary Examiner—Thanh Lam
(74) Attorney, Agent, or Firm—Senniger, Powers, Leavitt & Roedel

(57) ABSTRACT

A sensorless switched reluctance motor and its method of manufacture. A stator core having slots for receiving windings and having an opening for receiving a rotor for rotational about a rotational axis is provided. A separator is positioned adjacent to the stator to define to two separate sections in each of the slots, the sections having a contiguous side defined by a radial line passing through the rotational axis. Wire is guided by the separator into the slots to form the windings in the slots such that each slot has two different windings therein, one winding in each of the separate sections of each slot, and such that one of the windings in a particular slot is separated substantially along the radial line from the other winding in the particular slot. A rotor is inserted in the opening of the stator and the assembly of the motor is completed.

13 Claims, 14 Drawing Sheets

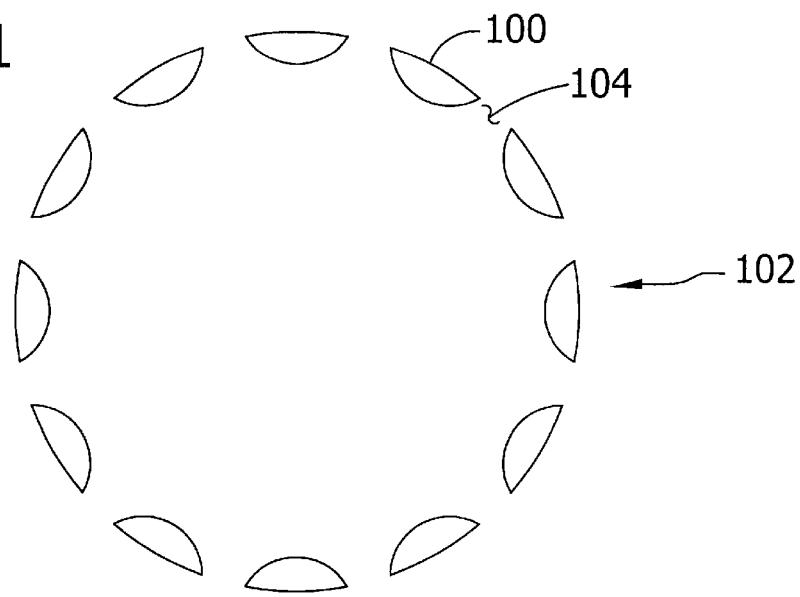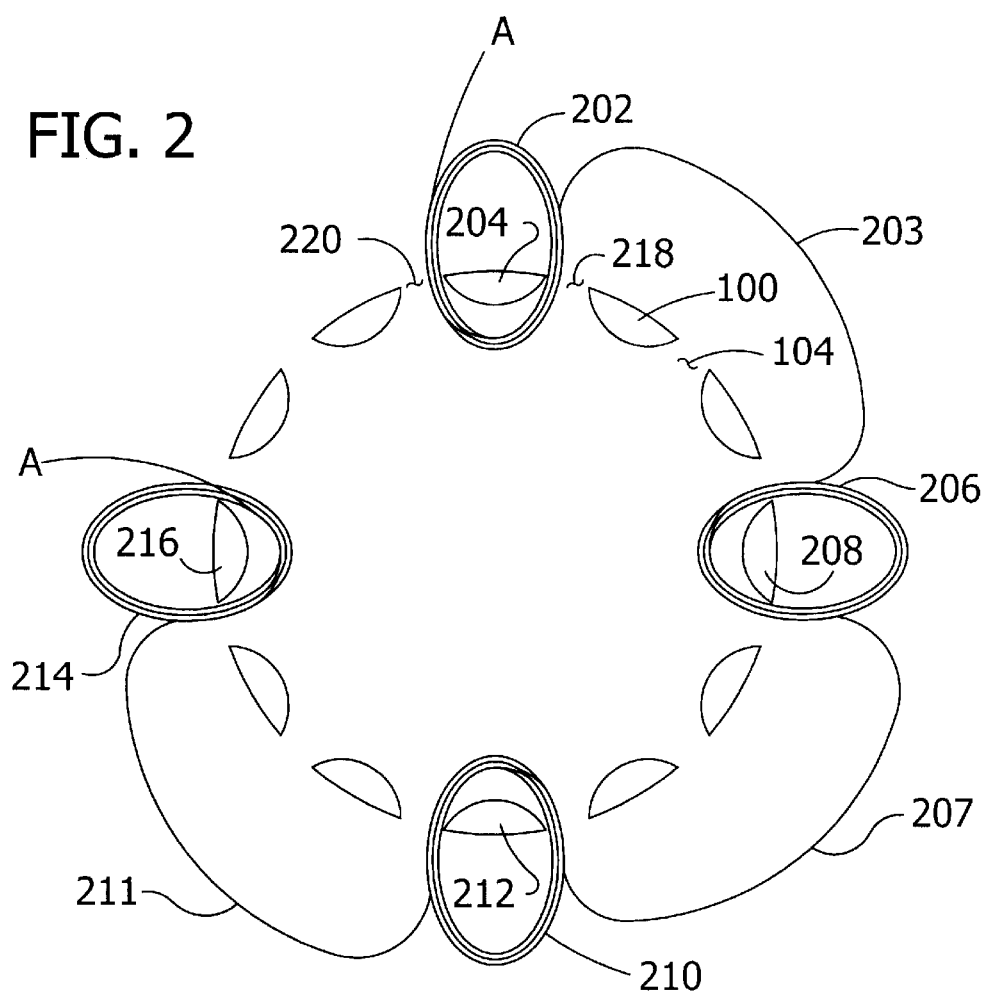

SWITCHED RELUCTANCE MOTOR HAVING WINDINGS SEPARATED BY A RADIAL LINE AND METHOD OF MANUFACTURE

BACKGROUND OF THE INVENTION

1. Field of the Invention

The invention generally relates to switched reluctance motors and, in particular, a sensorless switched reluctance motor and its method of manufacture.

2. Description of the Prior Art

Dynamoelectric machines such as switched reluctance motors comprise a rotor assembly and a stator assembly with respect to which the rotor assembly is movable. The machine may be a polyphase machine having 2, 3, 4, or 5 phases, for example. For such machines, the stator assembly includes a plurality of phase windings which are energized in a particular sequence depending upon the type of machine usage. The stator assembly includes a plurality of inwardly salient teeth spaced about the inner circumference of the stator assembly. The rotor includes a plurality of outwardly salient rotor teeth. Inherent in the construction of the motor are a wide variety of features. For example, the number of rotor teeth may equal the number of stator teeth. Also, the width of the respective rotor and stator teeth may differ. There is also usually a defined air gap between the rotor teeth and the stator teeth. This gap should be uniform about the perimeter of the stator and rotor assemblies. However, in actuality, there are usually variations in the air gap which can be discerned when the rotor teeth sweep past the stator teeth during machine operation. Stator windings are to befitted so they span a stator tooth. This may be arranged so portions of adjacent windings are side-by-side in a stator slot. Or, a winding may be arranged one above the other.

Sensorless switched reluctance motors and their methods of operation and manufacture generally depend on stored information of the flux-current-rotor position characteristics of the motor. The storage of this information entails a two-dimensional array to achieve acceptable accuracy. Some methods are only appropriate for relatively low speed operation for which the well known 'chopping' mode of current control applies and other methods are only appropriate for relatively high speed operation for which the well known 'single-pulse' mode of current control applies. While generally effective, it has been found that in some instances, the commutation angle control analysis is effected by bus ripple, transients on the bus, variations in the inductance characteristics from motor to motor and similar phenomena.

The physical structure of a motor which results from the above, in addition to the size and shape of machine stator and rotor laminations, creates an inherent electromagnetic environment within the motor. When the windings are side-by-side in a stator slot, it is desirable that the cross sectional pattern of the windings be substantially the same from motor to motor to minimize variations in the inductance characteristics from motor to motor. There is a need for a switched reluctance motor and its method of manufacture which will consistently produce motors which have small variations in their inductance characteristics from motor to motor.

SUMMARY OF THE INVENTION

The motor and method of the invention has a number of advantages over the prior art. The method results in a switched reluctance motor having windings that form a consistent cross sectional pattern from motor to motor so that the motors have similar and consistent inductance characteristics. Stators of such motors do not have significant inductance variations from stator to stator so that such stators may be used as part of sensorless switched reluctance motors. The method separates the windings as the windings are inserted in the stator slots so that a repeatable pattern within each slot is created.

In one form the invention comprises a method of manufacturing a switched reluctance motor comprising the steps of:

providing a stator core having slots for receiving windings and having an opening for receiving a rotor for rotational about a rotational axis;

positioning a separator adjacent to the stator to define to two separate sections in each of the slots, the sections having a contiguous side defined by a radial line passing through the rotational axis;

guiding wire by the separator into the slots to form the windings in the slots such that each slot has two different windings therein, one winding in each of the separate sections of each slot, and such that one of the windings in a particular slot is separated substantially along the radial line from the other winding in the particular slot; and inserting a rotor in the opening of the stator; and completing the assembly of the motor.

In another form, the invention comprises a method of manufacturing a switched reluctance motor comprising the steps of:

providing a stator having N teeth with N slots therebetween for receiving first, second and third windings and having an opening for receiving a rotor for rotational about a rotational axis;

providing N guides having N gaps therebetween wherein the N guides correspond to the N teeth and the N gaps correspond to the N slots;

positioning the windings in the N gaps;

positioning a separator such that each gap is separated into two sections substantially along a radial line passing through the rotational axis;

positioning the stator on the N guides such that the slots correspond to the gaps and each slot has two separate sections which correspond to the two separate gap sections;

guiding the positioned windings by the separator into the slots of the stator such that each slot has two different windings therein, one winding in each of the two separate sections of each slot, and such that one of the windings in a particular slot is separated substantially along the radial line from the other winding in the particular slot; and completing the assembly of the motor.

In another form, the invention is switched reluctance motor comprising a stator core having slots and a plurality of windings positioned within the slots such that each slot has two windings therein. One of the windings in a particular slot is separated substantially along a radial line from the other winding in the particular slot. A rotor is received within the core.

Other objects and features will be in part apparent and in part pointed out hereinafter.

BRIEF DESCRIPTION OF THE DRAWINGS

FIG. 1 is a top plan view of guides on a stator winding machine for receiving windings and for receiving a stator on which the windings will be inserted.

FIG. 2 is a top plan view of the guides of FIG. 1 having one winding A—A positioned within the guides.

Corresponding reference characters indicate corresponding parts throughout thee drawings.

DETAILED DESCRIPTION OF THE PREFERRED EMBODIMENTS

FIG. 1 is a top plan view of guides 100 on a stator coil insertion machine 102. These guides are generally an array of vertically oriented rods which have flat outer surfaces forming a cylindrical shape. The guides 100 are arranged and adapted to receive windings and to receive a stator in which the windings will be inserted. The guides 100 are configured to accommodate the particular stator and windings of the motor being manufactured. In general, a stator to be inserted will have N teeth with N slots between teeth. In the case of a three phase switch reluctance motor, one preferred embodiment according to the invention, the stator would be part of the three phase motor and would have twelve teeth and twelve slots and first, second and third windings. In addition, the stator would have an opening therein for receiving a rotor for rotation about a rotational axis. In general, the guides 100 would have N guides having N gaps therebetween wherein the N guides corresponds to the N teeth and the N gaps correspond to the N slots of the stator. In the embodiment illustrated in FIG. 1, the twelve teeth/twelve slot motor would be manufactured from twelve guides 100 having twelve gaps 104 therebetween.

Figure 3:
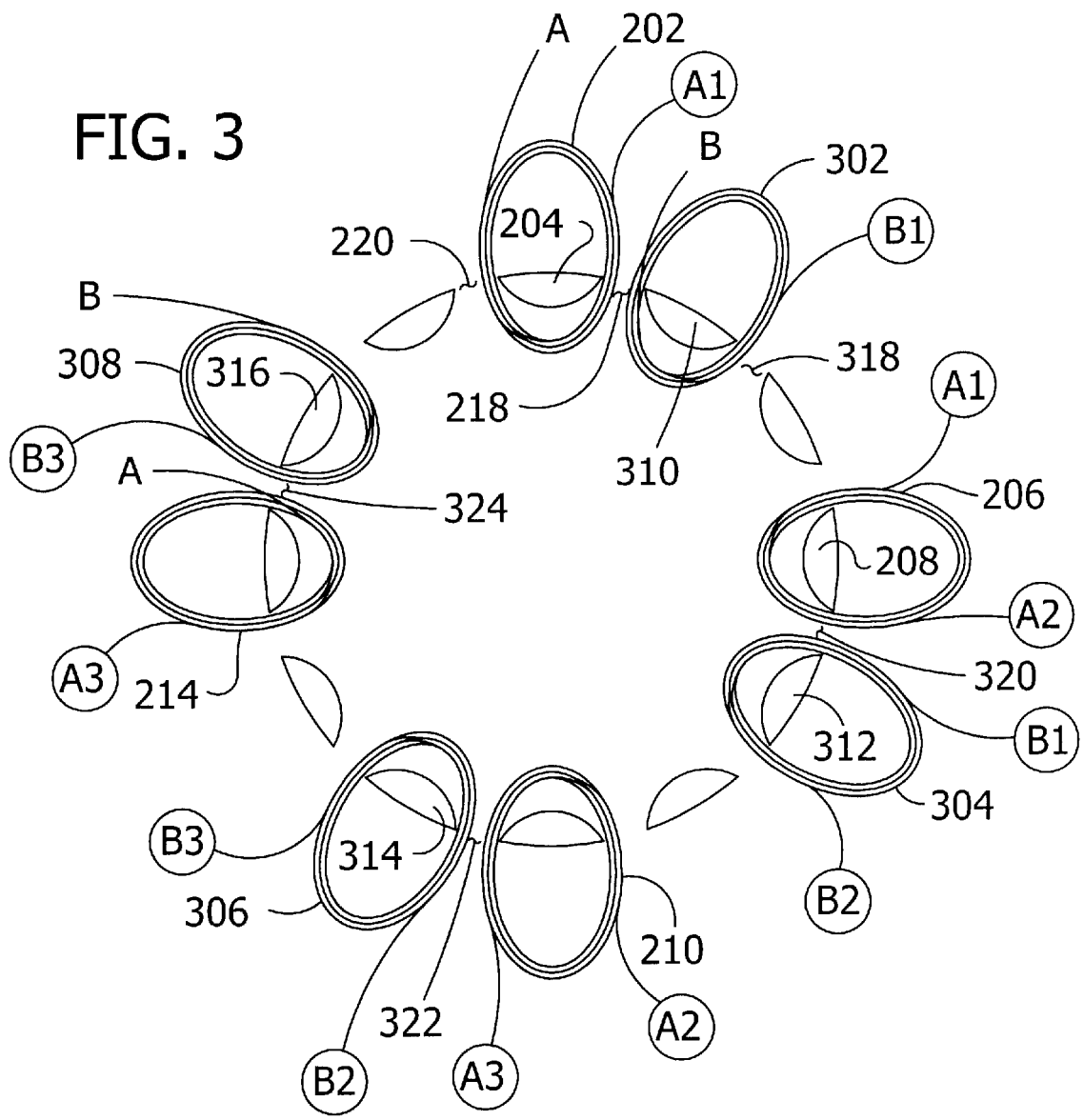
FIG. 3 is a top plan view of the guides of FIG. 1 having two windings A—A and B—B positioned within the guides.
Figure 4:
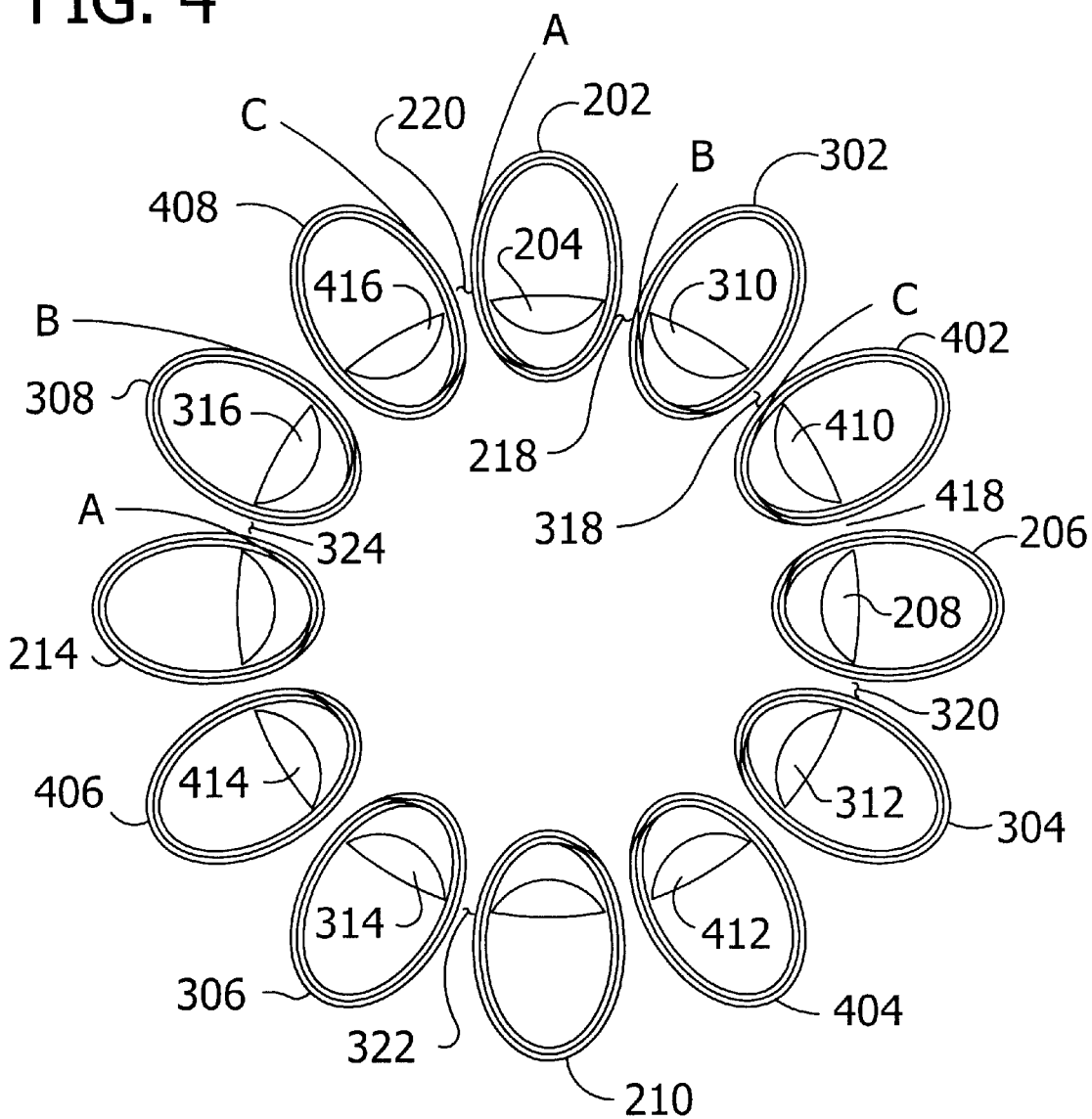
FIG. 4 is a top plan view of the guides of FIG. 1 having three windings A—A, B—B and C—C positioned within the guides.

The first steps in the process of assembling a motor according to the invention is positioning the windings in the twelve gaps 104 between the twelve guides 100. This process is illustrated in FIGS. 2–4. FIG. 2 is a top plan view of the guides 100 of FIG. 1 wherein one winding A—A has been positioned within the guides 100. Winding A—A is comprised of four coils of wires formed from a single wire. A first coil 202 is positioned over a guide 204. A second coil 206 is positioned over a guide 208 and is connected to the first coil 202 by a crossover wire 203. A third coil 210 is positioned over a guide 212 and is connected to the second coil 206 by a crossover wire 207. A fourth coil 214 is positioned over a guide 216 and is connected to the third coil 210 by a crossover wire 211. As a result, each coil is positioned within the gaps on either side of the guide on which it is located. For example, coil 202 is positioned in gaps 218 and 220 which are on either side of guide 204. The other coils 206, 210 and 214 are similarly positioned.

FIG. 3 is an illustration of the next step in the process and is a top plan view of the guides 100 of FIG. 1 having two windings A—A and B—B positioned within the guides. This step follows FIG. 2 and an additional set of four coils 302, 304, 306 and 308 which form the winding B—B are positioned on guides 310, 312, 314 and 316, respectively. The coils of winding A—A are connected by crossover wires as shown in FIG. 1. For simplicity, these crossover wires have been replaced by termination points A1, A2 and A3. Point A1 of coil 202 is connected to point A1 of coil 206. Point A2 of coil 206 is connected to point A2 of coil 210. Point A3 of coil 210 is connected to point A3 of coil 214. Similarly, the coils of winding B—B are connected by crossover wires (not shown). Interconnecting termination points B1, B2 and B3 represent the crossover wires of winding B—B.

Winding B—B is positioned in a similar manner with winding A so that each coil is located within the gap on either side of its corresponding guide. For example, coil 302 which is positioned on guide 310 is located in gaps 218 and 318 which are located on either side of guide 310. At this point it is important to note that coil 202 of winding A and coil 302 of winding B are both positioned within gap 218 which is located between guides 204 and 310. Similarly, coil 206 of winding A—A and coil 304 of winding B—B are both located in gap 320; coil 210 of winding A—A and coil 306 of winding B—B are both located in gap 322; and coil 214 of winding A—A and coil 308 of winding B—B are both located in gap 324.

The next step in the process is illustrated in FIG. 4 at which point the third and final winding of the three-phase motor to be manufactured is positioned on the remaining guides in a similar manner. FIG. 4 is a top plan view of the guides 100 of FIG. 1 having three windings A—A, B—B and C—C positioned within the guides 100. This step follows FIG. 3 and an additional set of four coils 402, 404, 406 and 408 which form the winding C—C are positioned on guides 410, 412, 414 and 416. The coils of winding C—C are connected by crossover wires (not shown) in the same manner as the coils of windings A—A and B—B. Interconnecting termination points C1, C2 and C3 represent the crossover wires of winding C—C.

Winding C is positioned in a similar manner with windings A and B so that each coil is located within the gap on either side of its corresponding guide. For example, coil 402 which is positioned on guide 410 is located in gaps 318 and 418 which are located on either side of guide 410. At this point it is important to note that coil 302 of winding B and coil 402 of winding C are both positioned within gap 318 which is located between guides 310 and 410. It is also important to note that coil 206 of winding A and coil 402 of winding C are both positioned within gap 418 which is located between guides 410 and 208. Similarly, the other coils of winding C—C share gaps with windings A—A and B—B.

Figure 5:
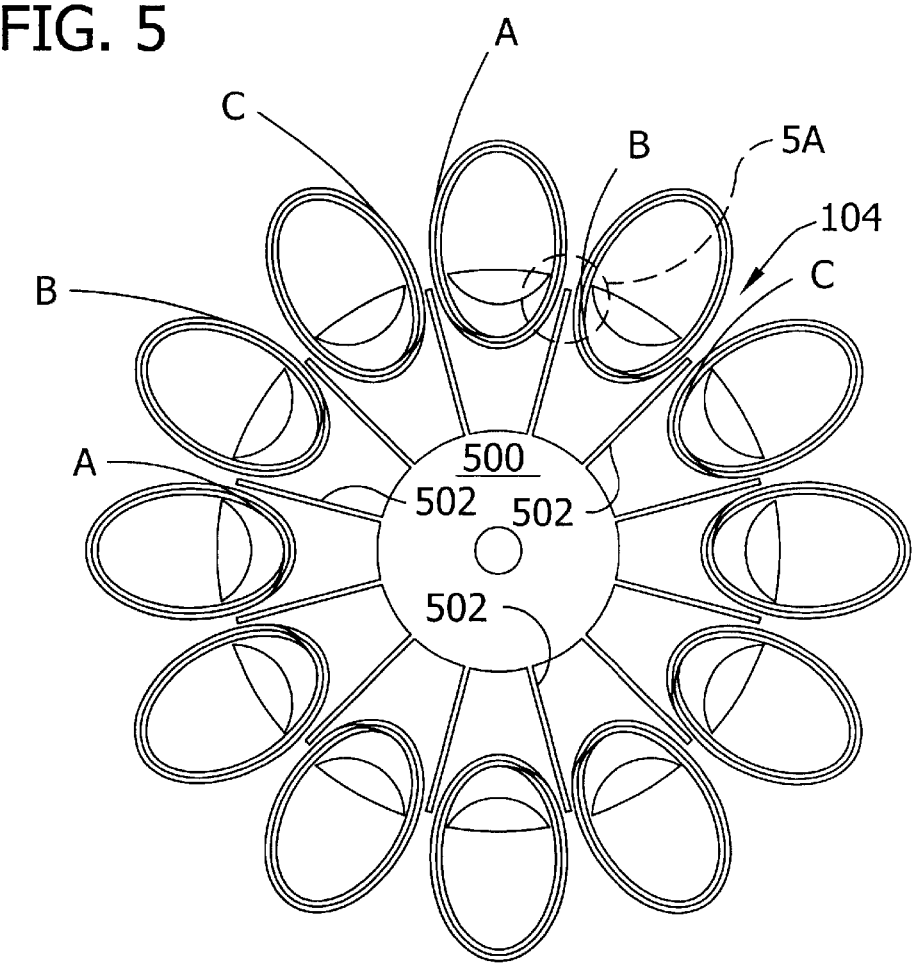
FIG. 5 is a top plan view of the guides of FIG. 1 having three windings A—A, B—B and C—C positioned within the guides and having a star stripper guide positioned under the windings and within the guides.

FIG. 5 illustrates the next step and is a top plan view of the guides of FIG. 1 having three windings A—A, B—B and C—C positioned within the guides 100 and having a star stripper 500 positioned under the windings and within the guides 100. As illustrated in FIGS. 10–13, the star stripper 500 is a separator tool adapted for use with the guides 100. The star stripper 500 is sometimes referred to as an inductance stabilizing axial inserting device because it is axially inserted into the guides 100 of the winding machine 102 and because it results in windings separated by a radial line which stabilizes inductance from motor to motor as the motors are manufactured. The star stripper 500 has a plurality of radially extending fins 502, each of which is positioned within one of the gaps 104 between the guides 100. FIGS. 10–13 illustrate one preferred embodiment of the star stripper 500, although other preferred embodiments are contemplated. In general, the star stripper 500 would be configured to work in conjunction with the particular guides of the particular winding being used for manufacturing the switch reluctance motor according to the invention.

Figure 5A:
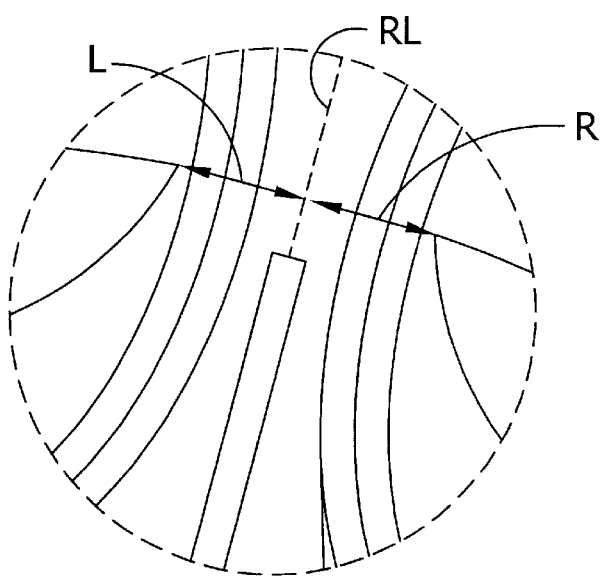
FIG. 5A is an exploded view of area 5A of FIG. 5.
Figure 10:
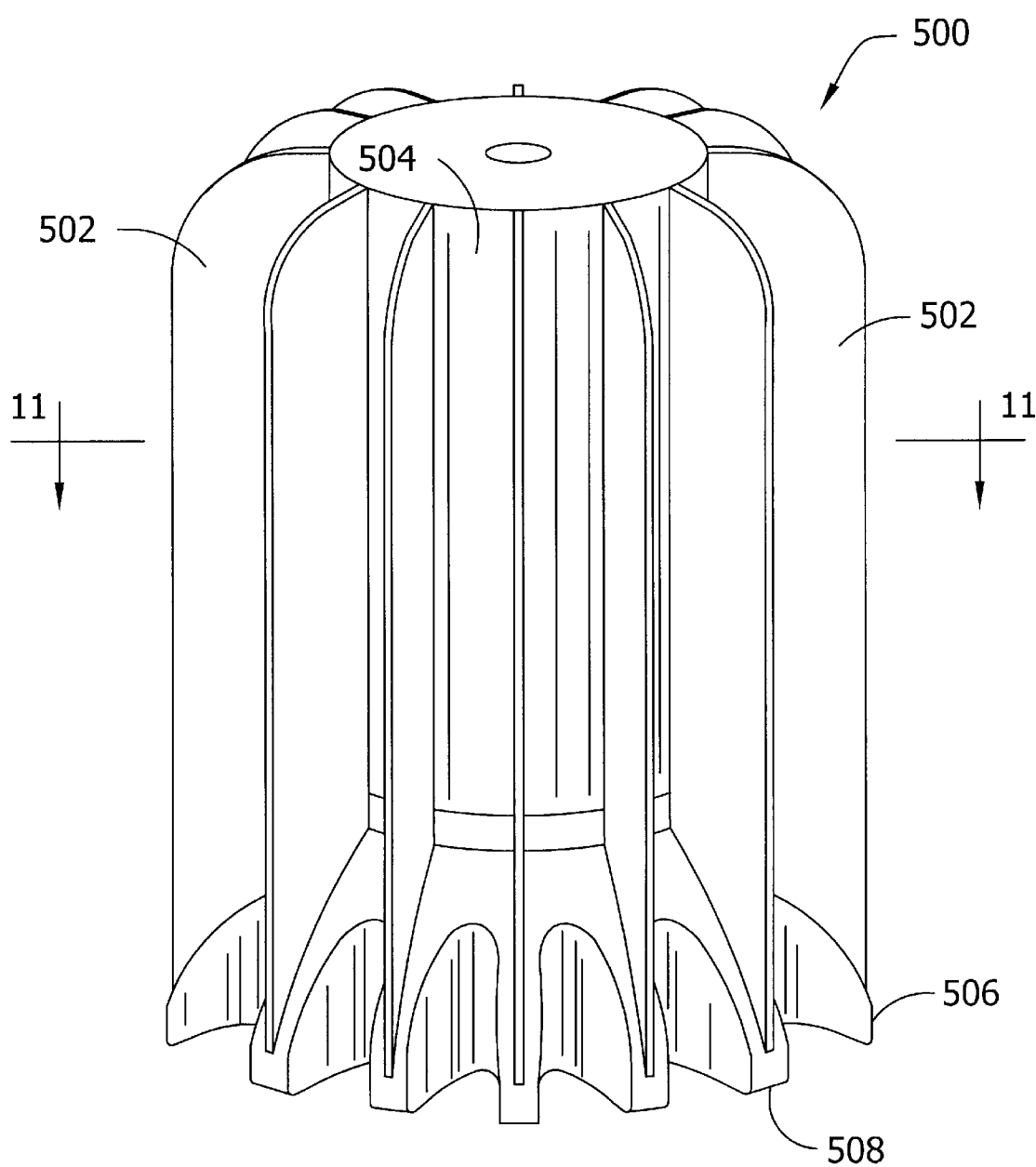
FIG. 10 is a top elevational view of a star stripper separator according to the invention.
Figure 11:
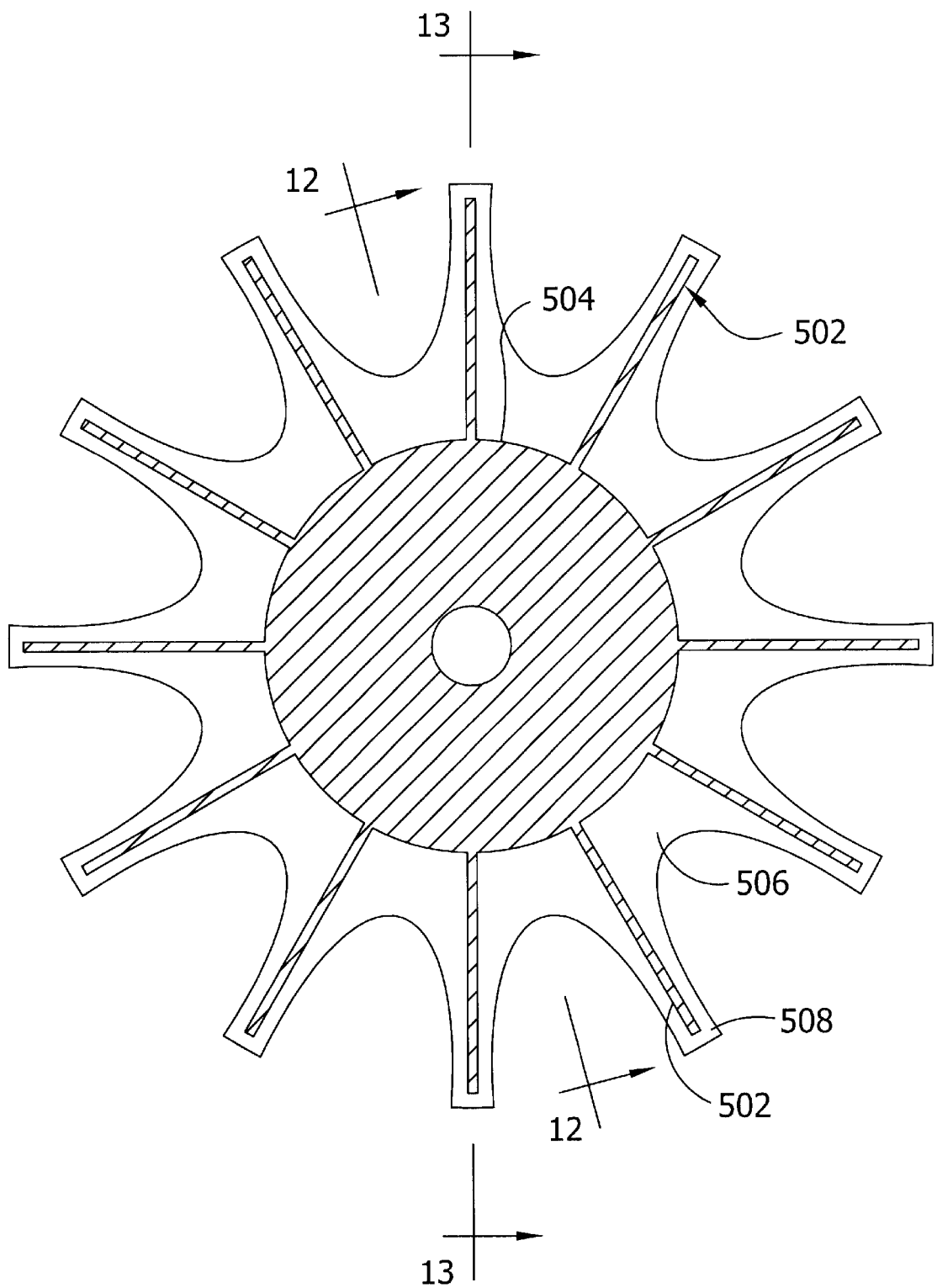
FIG. 11 is a horizontal cross-sectional view taken along lines 11—11 of FIG. 10.
Figure 12:
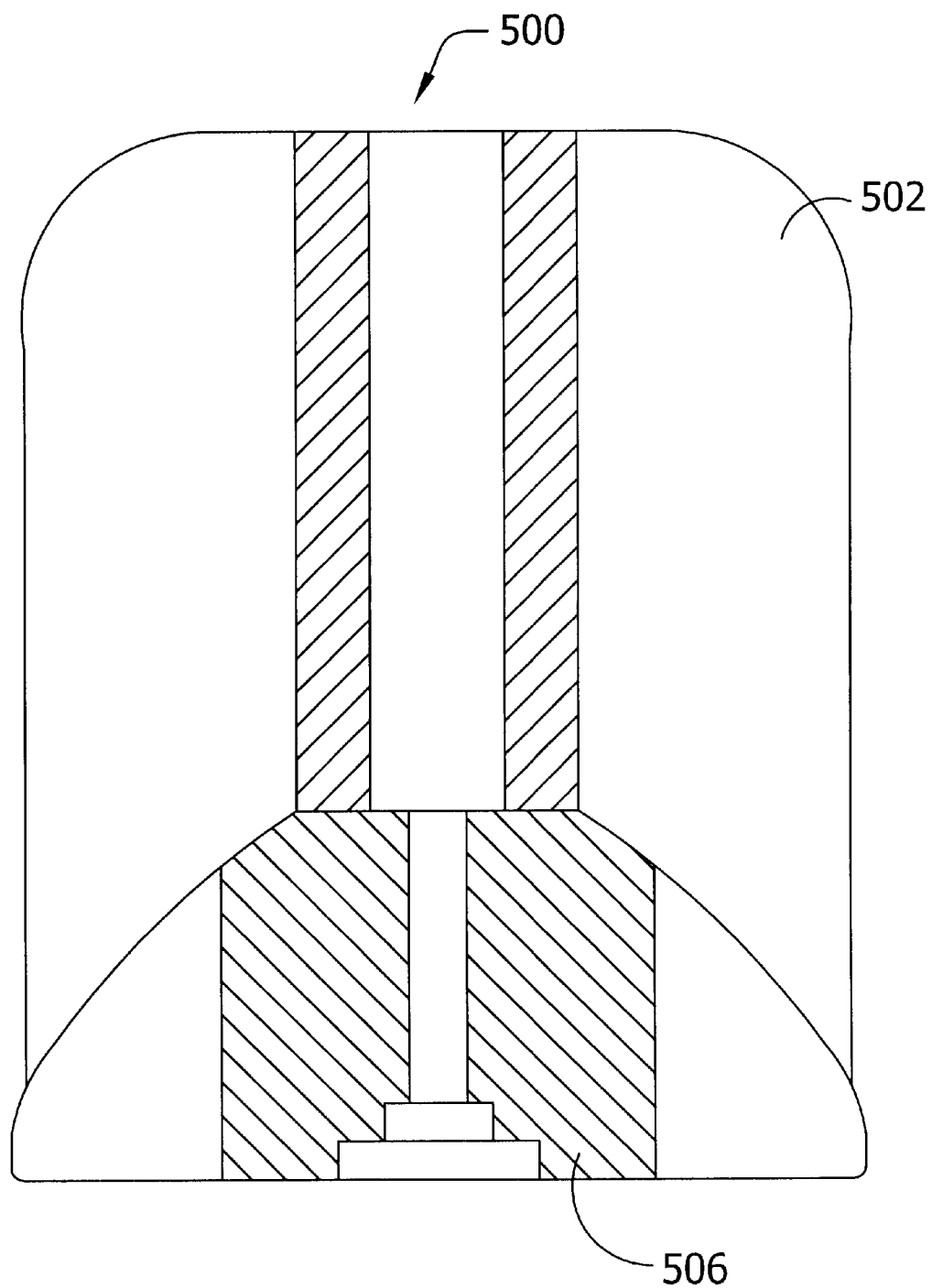
FIG. 12 is a vertical cross-sectional view taken along lines 12—12 of FIG. 11.
Figure 13:
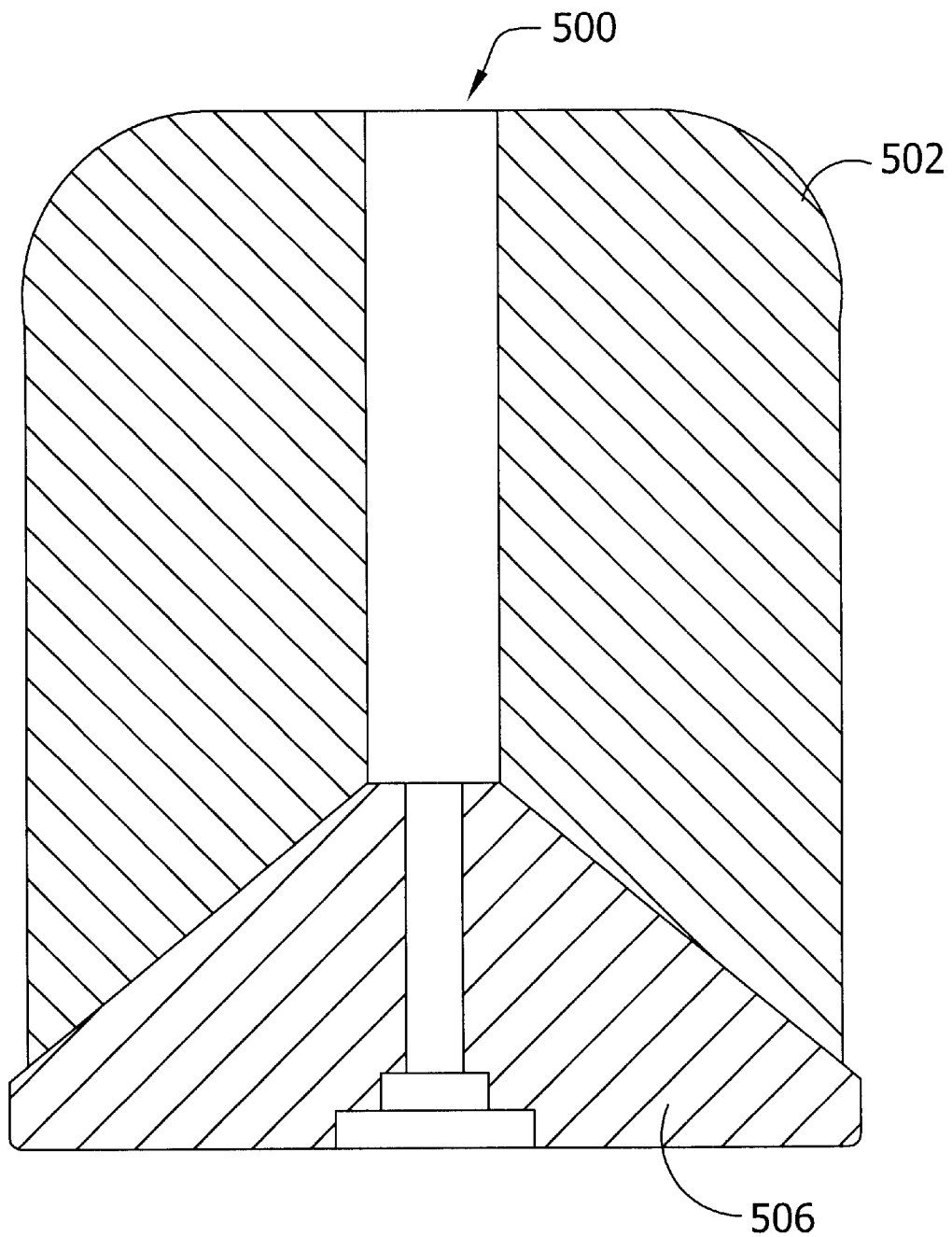
FIG. 13 is a vertical cross-sectional view taken along lines 13—13 of FIG. 11.

As shown in FIG. 10, the star stripper 500 has a generally cylindrical body 504 having radial fins 502 projecting from the periphery of the cylindrical body 504 and equally spaced about the periphery so that when the star stripper is positioned within the guides 100; one fin is positioned in each gap. The star stripper also includes a base 506 having a plurality of radially, outwardly projecting and equally spaced members 508. Each member 508 receives one of the fins 502. The width of each member 508 is greater than the width of the fin 502. In fact, the width of the member 508 is configured to be slightly less than the width of each gap. As a result, when the star stripper 500 including the base 506 is positioned within the guides, the members 508 are snugly positioned within the gaps so that the fins 502 are essentially centered within the gaps and separate the gaps into two sections. As a result, the star stripper 500 constitutes a tool or separator which is positioned within the guides 100 and gaps 104 such that each gap 104 is separated into two sections L and R substantially along a radial line RL passing through the rotational axis. This aspect is illustrated particularly in FIG. 5A which is an exploded illustration of the area 5A of FIG. 5.

Figure 6A:
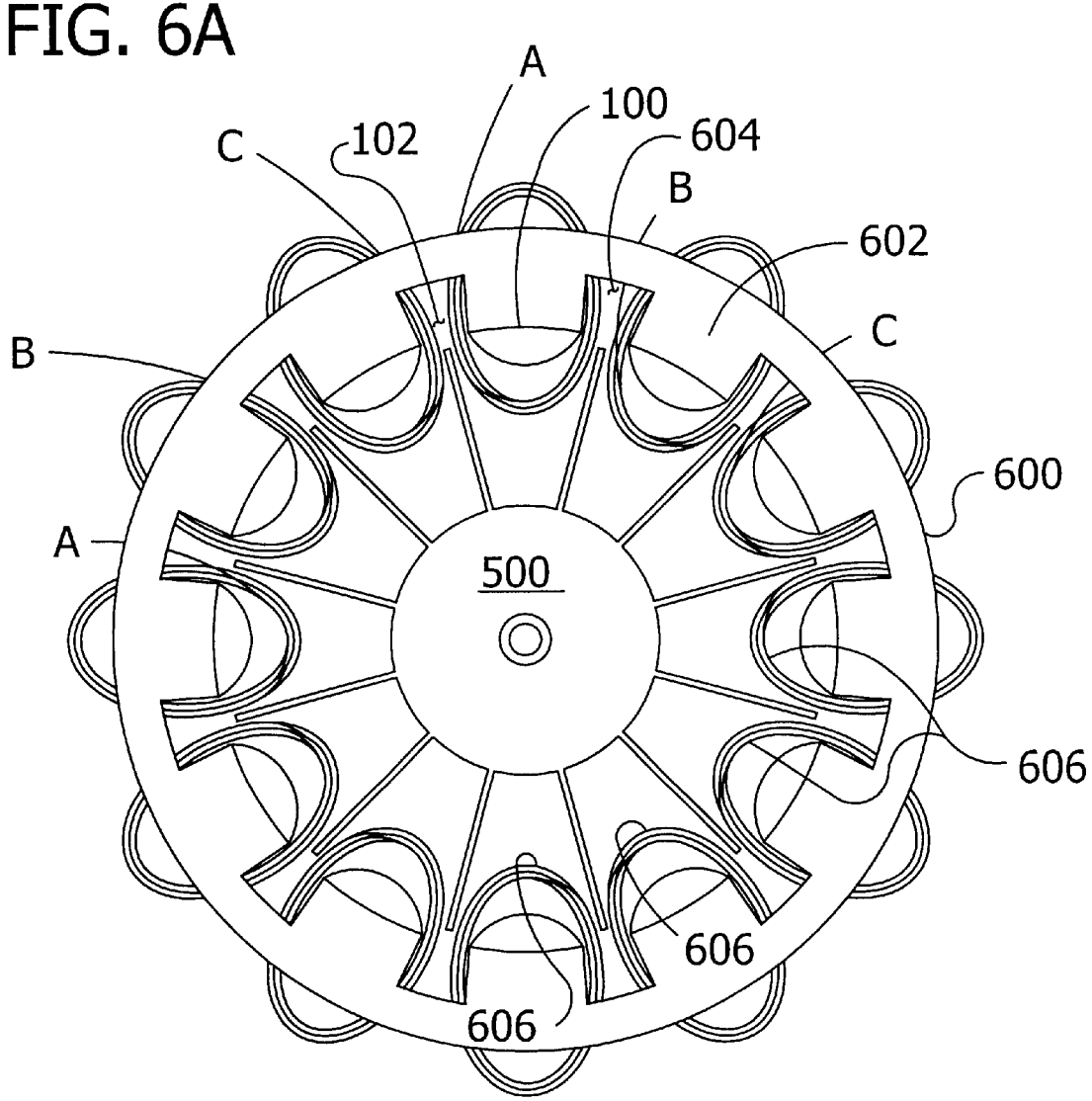
FIG. 6A is a top plan view of the guides of FIG. 1 having three windings A—A, B—B and C—C positioned within the guides, having a star stripper separator of the invention positioned under the windings and within the guides and having a stator positioned on the guides and over the windings.
Figure 6B:
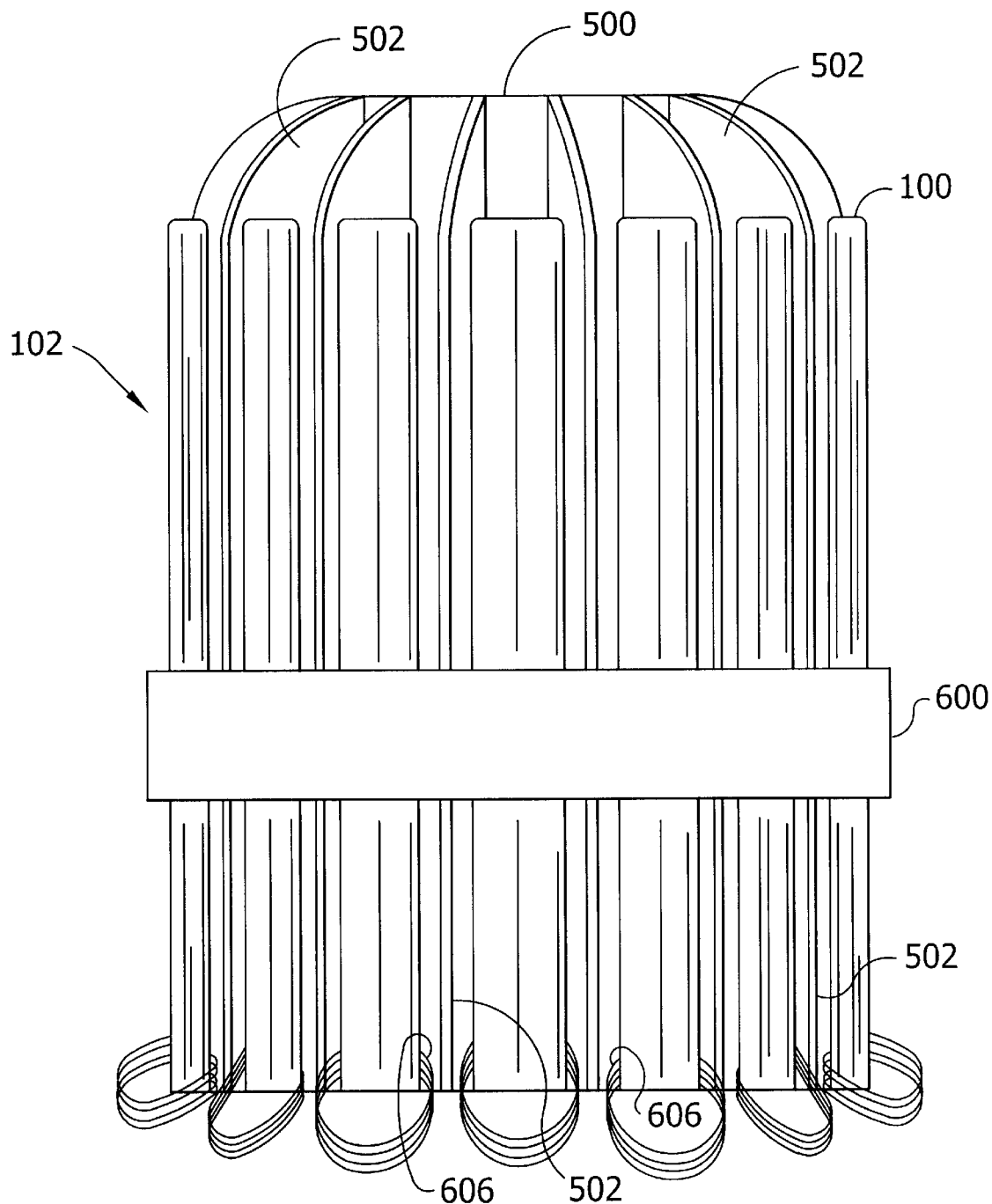
FIG. 6B is a side plan view of the guides of FIG. 6A.

After FIG. 5, the next step is illustrated in FIG. 6A which is a top plan view of the guides 100 of FIG. 1 having three windings A—A, B—B and C—C positioned within the guides 100, having a star stripper 500 positioned under the windings and within the gaps of the guides and having a stator 600 positioned on the guides and over the windings. As noted above, the stator has twelve teeth 602 which correspond to the twelve guides 100 and has twelve slots 604 which correspond to the twelve gaps 104 between the guides. The stator 600 is positioned on the guides 100 such that the slots 604 correspond to the gaps 104 and the teeth 602 correspond to the guides 100. Each slot 604 is positioned in correspondence with the star stripper 500 such that each slot 604 has two separate sections of the gaps 104 which are defined by the fins 502 of the star stripper 500. FIG. 6B is a side plan view of the guides of FIG. 6A.

Figure 7:
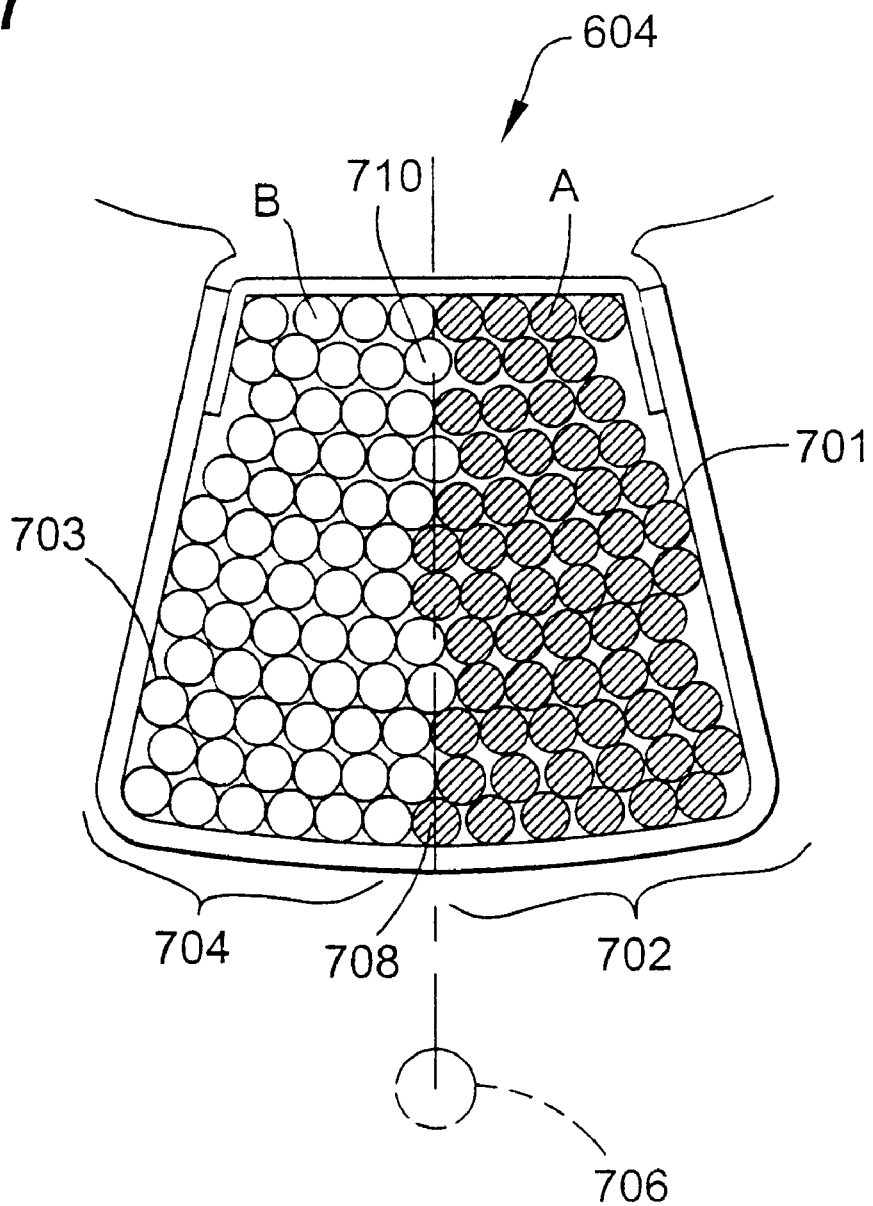
FIG. 7 is a partial cross-sectional view of the turn distribution according to the invention of two windings in a slot of switched reluctance motor of the invention assembled with the star stripper separator to guide the two windings into the slot.

In the next step, the windings are moved into positioned onto the teeth 602 of the stator 600. In particular, the winding machine is activated by an operator to guide the inner portions 606 of the coils of each winding onto the teeth 602 of the stator 600. FIG. 6B shows the star stripper 500 as it is moving upward before the coils are engaged and inserted into the stator 600. When the insertion process is completed, the coils are inserted into the slots of the stator 600 as guided by the fins. As a result, each slot 604 has two different windings therein, one winding in each of the two separate sections of each slot. FIG. 7 is a partial cross-sectional view of the turn distribution according to the invention. As illustrated in FIG. 7, each winding has a substantially radially, symmetrical turn distribution such that the windings are separated by a radial line. In the slot 604 shown in FIG. 7, the slot 604 has first wires 701 from winding A—A forming a first winding in a first section 702 of the slot 604. Slot 604 also has second wires 703 from winding B—B forming a second winding in a second section 704 of the slot 604. Winding A—A is separated from winding B—B substantially along a radial line 706. The windings are symmetrical about line 706 in that wires 701 of winding A are a mirror images of wires 703 of windings B. The radial line 706 passes through a mid-point of the slot 604 and separates section 702 from section 704. Furthermore, it is preferable that at most only portions of the wires 701 of winding A—A are positioned in section 704 and at most only portions of the wires 703 of winding B—B are positioned within section 702. For example, only a portion of wire 708 (which is a part of winding A—A) is located within section 704 which includes primarily winding B—B. Similarly, wire 710 (which is a part of winding B—B) has a portion which is positioned within section 702 which includes primarily winding A—A. It is preferable that no entire wires of winding A—A are positioned within section 704 which primarily constitutes winding B—B and, vice versa, no entire wires of winding B—B are positioned in section 702 which primarily constitutes windings A—A.

Each of the slots of the stator 600 has a similar turn distribution as shown in FIG. 7. In FIG. 7, a slot including windings A—A and B—B is illustrated. Other slots will have windings A—A and C—C with a substantially similar turn distribution. Other slots will have windings B—B and C—C with a substantially similar turn distribution.

Figure 9:
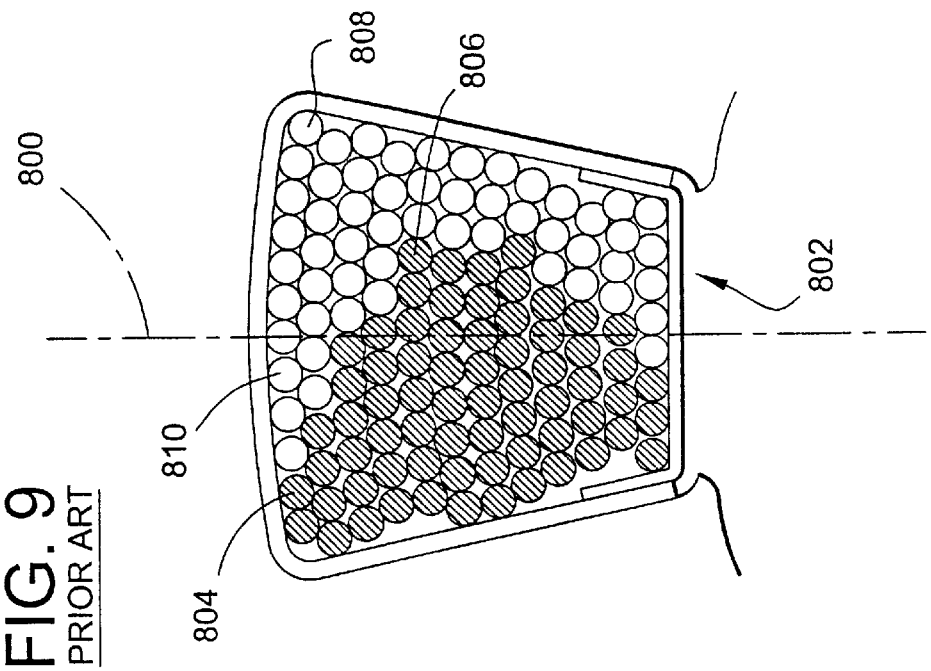
FIG. 9 is a partial cross-sectional view of another example of a turn distribution according to the prior art of two windings in a slot of switched reluctance motor assembled without a star stripper separator to guide the two windings into the slot.
Figure 8:
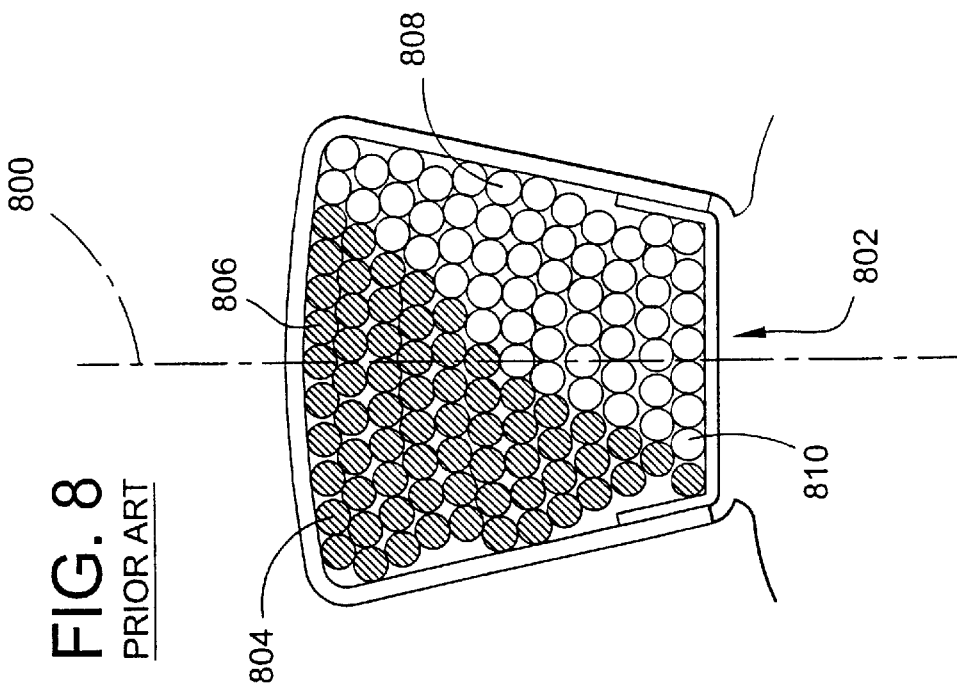
FIG. 8 is a partial cross-sectional view of one example of a turn distribution according to the prior art of two windings in a slot of switched reluctance motor assembled without a star stripper separator to guide the two windings into the slot.

It has been found that such a turn distribution is particularly beneficial in a sensorless switch reluctance motor which does not have any sensors to detect the position of the rotor. Such a turn distribution provides a total motor inductance variation from motor to motor which is ±1.5% or less of a nominal desired value for the motor. This is in contrast to the non-symmetrical turn distribution illustrated in FIGS. 8 and 9 A which generally results when a star stripper 500 is not used as part of the assembly of the motor. The turn distributions in FIGS. 8 and 9 result in total motor inductance variation from motor to motor of greater than 1.5% which significantly reduces the efficiency and accuracy to the point that sensorless SRM devices are not consistent enough to be usable. As shown in FIGS. 8 and 9, many of the wires from one winding are intertwined with the wires from another winding. In particular, a radial line 800 passes through a mid-point of the slot 802. Shaded wires 804 and 806 indicate wires from a first winding and unshaded wires 808 and 810 indicate wires from a second, different winding. It is noted that a majority of the wires of the first winding are located to the left of radial line 800 and a majority of the wires from the second winding are located to the right of the radial line 800. However, a substantial number of wires from the first winding are also located to the right of the radial line 800 and have been referred to by reference character 806. Similarly, a substantial number of the wires from the second winding are located to the left of radial line 800 and referred to by reference character 810. FIGS. 8 and 9 illustrate a prior art turn distribution wherein the windings are not separated by a radial line.

Figure 14:
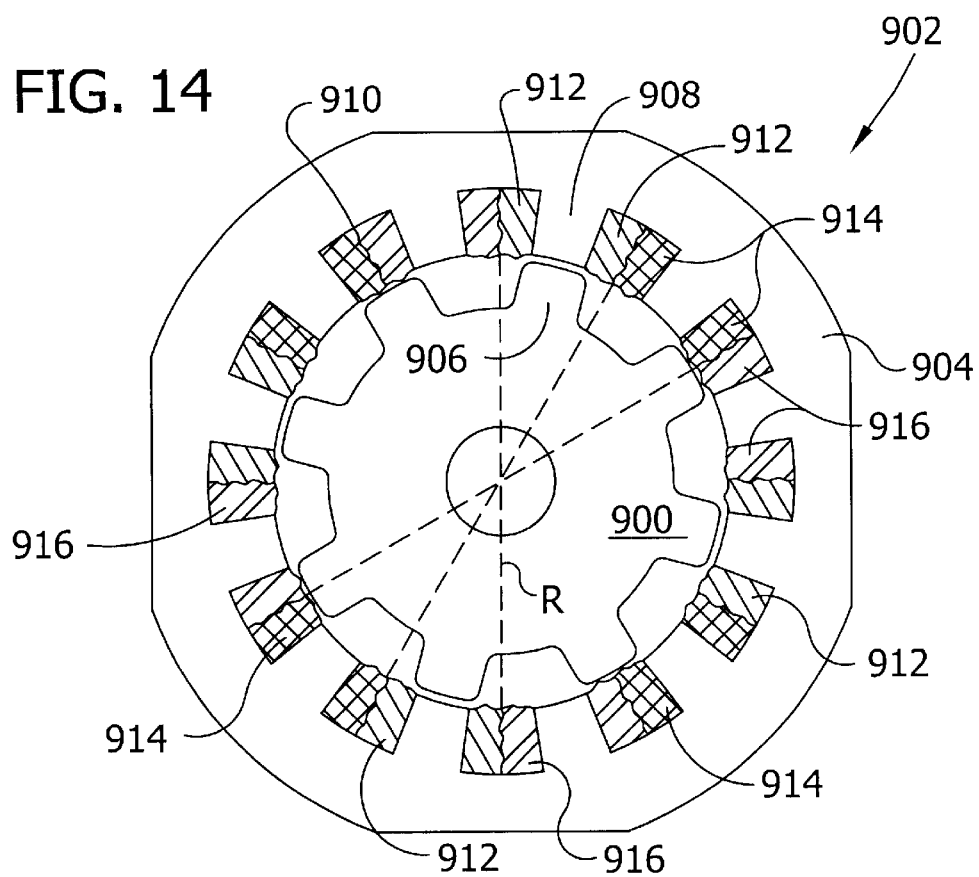
FIG. 14 is a cross-sectional view taken perpendicular to the axis of rotation of the rotor of a switched reluctance motor of the invention showing the stator and rotor in a maximum inductance position.

FIG. 14 is a cross-sectional view taken perpendicular to the axis of rotation of a rotor 900 of a sensorless switch reluctance motor 902 of the invention showing an assembled stator 904 and the rotor 902 in a maximum inductance position. This position is essentially a position wherein teeth 906 of the rotor are contiguous with and radially opposite the teeth 908 of the stator 904. The motor 902 includes a plurality of windings positioned within the slots 910 of the stator. Each slot has two windings therein. Reference character 912 refers to a first winding whereas reference character 914 refers to a second winding whereas reference character 916 refers to a third winding. Each of the windings in each of the slots is separated substantially along a radial line R from the other winding in the same slot.

Figure 15:
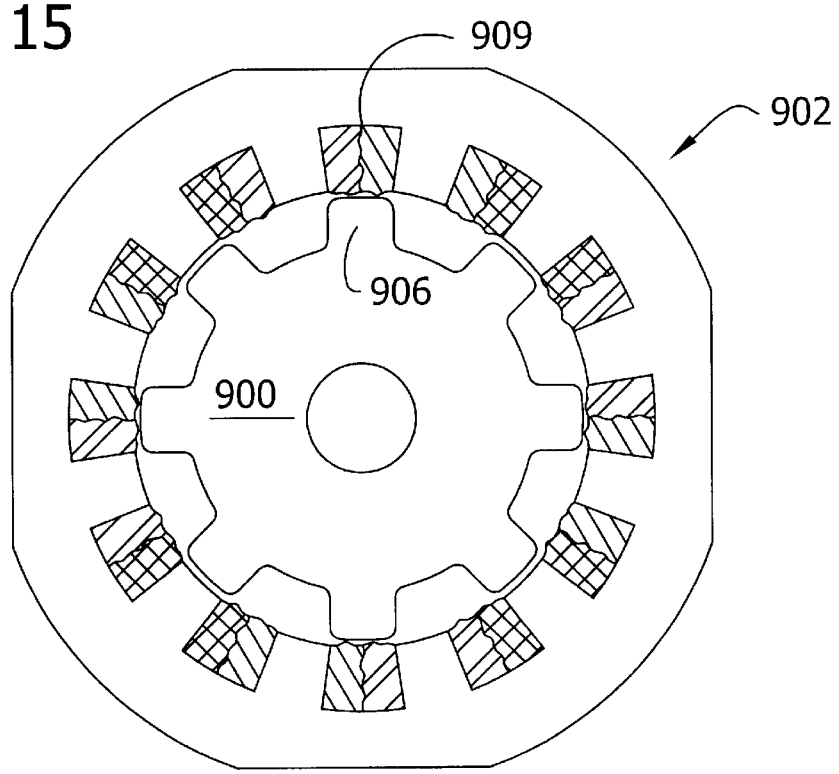
FIG. 15 is a cross-sectional view taken perpendicular to the axis of rotation of the rotor of a switched reluctance motor of the invention showing the stator and rotor in a minimum inductance position.

In contrast, FIG. 15 is a cross-sectional view taken perpendicular to the axis of rotation of the rotor 900 of the switch reluctance motor 902 of the invention showing an assembled stator 904 and rotor 902 in a minimum inductance position. In this position, the rotor teeth 906 are contiguous to and radially opposite from the slots. As mentioned above, measuring the total motor inductance variation at the minimum inductance position and the maximum inductance position provides indication of the quality and consistency of the motor. In the course of manufacturing of a plurality of motors, it has been found that the total motor inductance variation is about ±1.5% or less of a nominal value at minimum and maximum which each winding has a substantially radially, symmetrical turn distribution.

Figure 16:
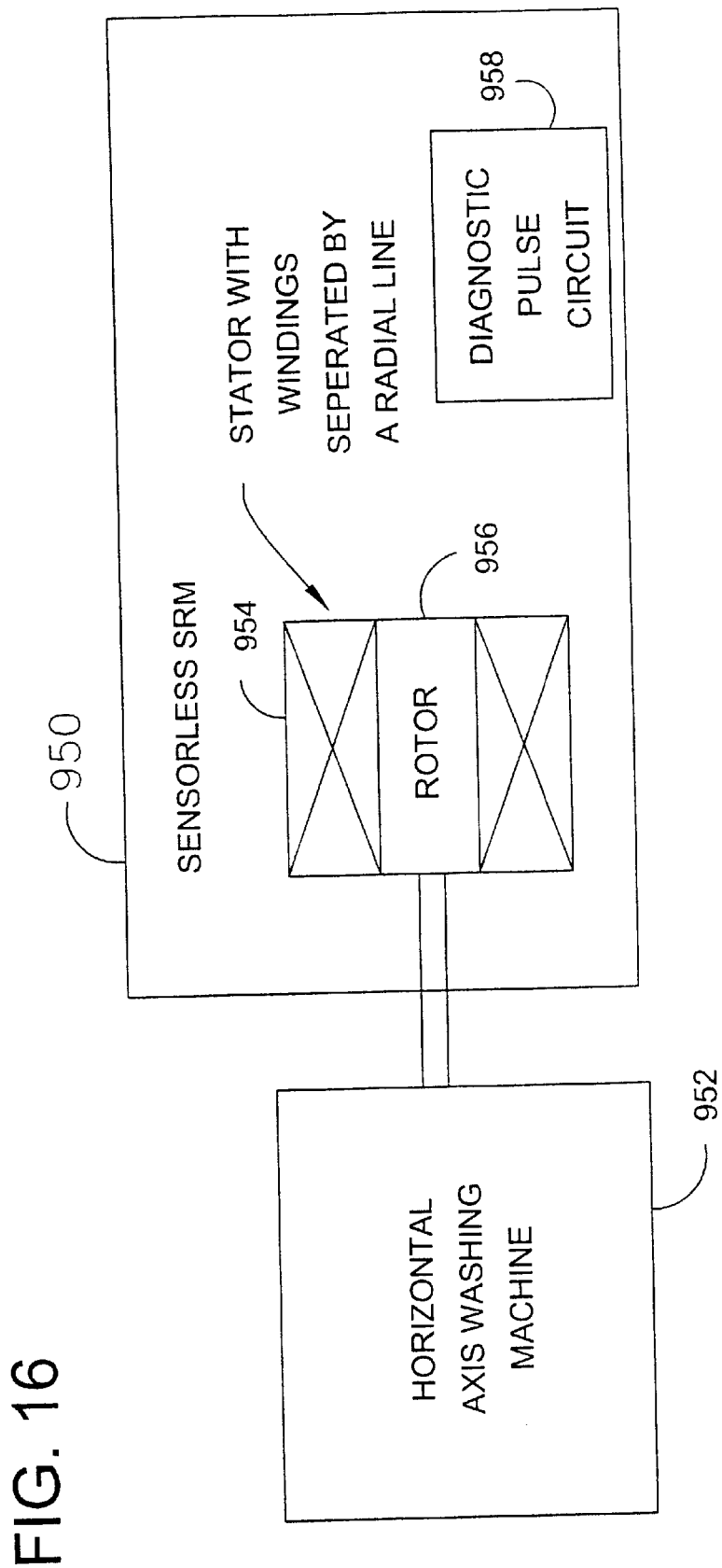
FIG. 16 is a block diagram of a sensorless switched reluctance motor of the invention driving a horizontal axis washing machine.

As shown in FIG. 16 in block diagram form, one preferred application of the sensorless SRM 950 according to the invention is for driving a horizontal axis washing machine 952. In particular, the sensorless SRM 950 would have a stator 954 with radially symmetrical turn distribution as indicated above. The stator 954 would receive a rotor 956 which would be driven by the energization of the stator. The stator 954 would be energized according to the position of the rotor 956 which would not be detected by sensors but would be detected by pulses applied to the windings as generated by a diagnostic pulse circuit 958. The rotor 956 would drive a shaft 960 which in turn would drive a horizontal axis washing machine 952. Such exemplary motors and their uses are disclosed in the following U.S. patents which are incorporated herein by reference: U.S. Pat. Nos. 5,467,025; 5,457,375; 5,701,064; 5,793,179; and 5,929,590. The assembly tool and method described above creates a more predictable inductance for any switched reluctance motor independent of the sensorless technique employed.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:
1. A sensorless switched reluctance motor which does not have any sensors to detect the position of the rotor comprising:
   a sensor core having slots;
   a plurality of windings positioned within, the slots such that each slot has two windings therein such that one of the windings in a particular slot is separated substantially along a radical line from the other winding in the particular slot and wherein the one winding is in contact with the other winding along the radial line; and
   a rotor received within the core.
2. The motor of claim 1 wherein each winding is separated from its adjacent winding by a substantially radial line.
3. The motor of claim 1 wherein at least one of the slots has first wires forming a first winding in a first section of the one slot and has second wires forming a second winding in a second section of the one slot, and wherein the radial line passes through a midpoint of the one slot and separates the first and second sections such that only portions of the first wires are positioned in the second section and such that only portions of the second wires are positioned in the first section whereby no entire first wires are positioned in the second section and no entire second wires are positioned in the first section.
4. The motor of claim 3 wherein another one of the slots has second and third sections and has the second wires forming the second winding in the second section of the another slot and has third wires forming a third winding in the third section of the another slot, and wherein another radial line passes through a midpoint of the another slot and separates the second and third sections such that only portions of the second wires are positioned in the third section and such that only portions of the third wires are positioned in the second section whereby no entire second wires are positioned in the third section and no entire third wires are positioned in the second section and whereby the motor is a three phase motor.
5. The motor of claim 1 further comprising a diagnostic pulse circuit for generating pulses applied to the windings whereby a position of the rotor relative to the stator can be determined without directly detecting the position of the rotor.
6. The motor of claim 1 wherein the radial line passes through a rotational axis of the rotor and wherein from an inner periphery of a particular slot to an outer periphery of the particular slot the windings in the particular slot are separately by the radial line.
7. A sensorless switched reluctance motor which does not have any sensors to detect the position of the rotor comprising:
   a stator core having slots;
   a plurality of windings positioned within the slots such that each slot has two windings therein such that one of the windings in a particular slot is separated substantially along a radial line from the other winding in the particular slot and wherein the one winding is in contact with the other winding along the radial line;

a rotor received within the core; and wherein the total motor inductance variation is about ±1.5% or less of a nominal value.

8. The motor of claim 7 wherein the radial line passes through a rotational axis of the rotor and wherein from an inner periphery of the particular slot to an outer periphery of the particular slot the windings in the particular slot are separated by the radial line.

9. An apparatus comprising:

a sensorless switched reluctance motor which does not have any sensors to detect the position of the rotor comprising:

a stator core having slots;

a plurality of windings positioned within the slots such that each slot has two windings therein such that one of the windings in a particular slot is separated substantially along a radial line form the other winding in the particular slot and wherein the one winding is in contact with the other winding along the radial line;

a rotor received within the core; and a horizontal axis winding machine having a drive unit and wherein the rotor is in driving relation to the drive unit.

10. The motor of claim 9 wherein the radial line passes through a rotational axis of the rotor and wherein from an inner periphery of the particular slot to an outer periphery of the particular slot the windings in the particular slot are separated by the radial line.

11. A sensorless switched reluctance motor comprising:

a stator core having a plurality of slots;

a rotor sized and shaped for being positioned within the stator core, wherein a rotational position of the rotor relative to the stator core is not sensed for opening the motor;

a plurality of windings positioned within the plurality of slots;

wherein each of said plurality of slots has two of said plurality of windings positioned therein;

wherein each of said two windings positioned in each slot has a substantially radially symmetrical turn distribution such that said two windings are positioned relative to each other within the slot along either side of a radial line bisecting the slot; and wherein said two windings positioned in each slot are in contact with each other along the radial line.

12. A sensorless switched reluctance motor as set forth in claim 11 wherein the radial line bisecting the slot passes through about the midpoint of the slot thereby bleaching the slot into a first half and a second half such that a first one of the two windings within the slot is positioned in the first half of the slot and a second one of the two windings within the slot is positioned in the second half of the slot.

13. The motor of claim 11 wherein the radial line passes through a rotational axis of the rotor and wherein from an inner periphery of each of the slots to an outer periphery of each of the slots the windings in each of the slots are separated by the radial line.

* * * * *

UNITED STATES PATENT AND TRADEMARK OFFICE
CERTIFICATE OF CORRECTION

PATENT NO. : 6,621,189 B1
DATED : September 16, 2003
INVENTOR(S) : Kenneth L. Flynn It is certified that error appears in the above-identified patent and that said Letters Patent is hereby corrected as shown below:

<u>Column 8,</u>
Line 13, "a sensor core" should read -- a stator core --.
Line 15, "within, the slots" should read -- within the slots --.
Line 17, "a radical line" should read -- a radial line --.
Line 57, "separately by" should read -- separated by --.

<u>Column 10,</u>
Lines 3-4, "opening the motor" should read -- operating the motor --.

Signed and Sealed this

Twenty-seventh Day of July, 2004

JON W. DUDAS
*Acting Director of the United States Patent and Trademark Office*